Nov. 28, 1933.　　　E. C. GOEBERT　　　1,936,596
JACK
Filed Nov. 11, 1932
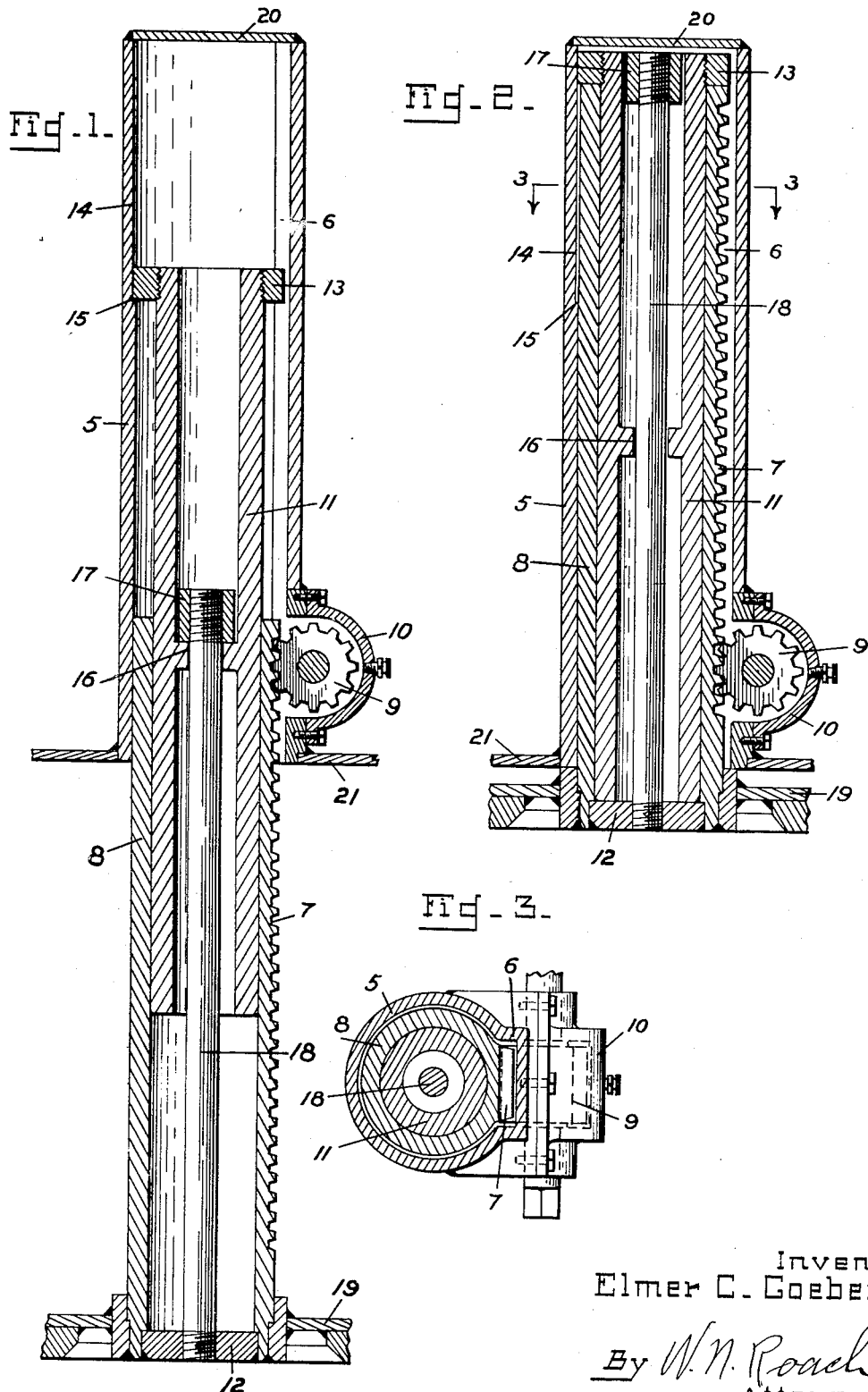
Inventor
Elmer C. Goebert
By W. N. Roach
Attorney Patented Nov. 28, 1933

1,936,596

UNITED STATES PATENT OFFICE 1,936,596

JACK

Elmer C. Goebert, United States Army, Philadelphia, Pa.

Application November 11, 1932
Serial No. 642,233

5 Claims. (Cl. 254—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a jack.

The purpose of the invention is to increase the effective bearing between an extensible member and its casing. A further object is to employ the bearing member for limiting movement of the extensible member.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a longitudinal sectional view of the improved jack showing the jack in fully extended position.

Fig. 2 is a similar view showing the parts telescoped, and

Fig. 3 is a sectional view on the line 3—3 of Fig. 2.

The jack consists of a tubular casing 5 having an angular offset 6 for receiving the rack teeth 7 on a tubular rack member 8 slidably mounted in the casing. A spur gear 9 meshing with rack teeth 7 is mounted in a housing 10 secured to the lower end of the casing.

A tubular guide sleeve 11 is mounted for sliding movement within the rack member 8. The sleeve 11 is of substantially the same length as the rack member so that when its lower end rests on the disk 12 closing the bottom of the rack member, its upper end will extend beyond the corresponding end of the rack member. A collar 13 conveniently threaded on the extended upper end of the guide sleeve has a close sliding fit in the casing. The casing is preferably formed with a counterbore 14 in order to provide a shoulder 15 for limiting movement of the sleeve.

The interior of the sleeve 11 is provided intermediate its ends with a shoulder 16 adapted to be engaged on its upper side by a nut 17 on the end of a rod 18. The lower end of the rod is secured in the disk 12.

A foot 19 is secured to the lower end of the rack member. A disk 20 is secured to the upper end of the casing 5. The casing 5 is shown as being secured to a plate 21 which in the particular application of the invention represents a gun carriage. In the particular employment of the jack the customary ratchet mechanism is not needed and none is shown.

When the jack is not shown in operation the parts are telescoped as shown in Fig. 2. In operation the spur gear 9 is rotated to lower the rack 8 and the sleeve 11 may follow through the influence of gravity. If the sleeve does not follow the rack, in this manner its shoulder 16 is engaged by the nut 17 on the rod 18 at about the middle of the stroke of the rack and is thereby forced downwardly as indicated in Fig. 1. The engagement of the collar 13 of the sleeve with the shoulder 15 of the casing limits the extension of the sleeve as well as the extension of the rack.

The purpose of extending the sleeve 11 relative to the casing 5 is to increase the effective bearing surface of the rack when extended. This is clearly shown in Fig. 1, where one-half of the sleeve is in supporting contact with the fully extended rack while the collar 13 on the inner end of the sleeve bears against the upper portion of the casing 5.

The purpose in limiting the extension of the rack is to prevent the spur gear from jamming the upper end of the rack member beyond the last tooth.

In the reverse operation to telescope the parts, the disk 12 of the rack engages the lower end of the sleeve to cause the sleeve to partake of the return movement and be restored to the position shown in Fig. 2.

While in the present invention the rack is shown as a downwardly extensible member it is to be understood that the device may be inverted so that the rack is upwardly extensible.

I claim:

1. In a jack, a casing, a gear carried by the casing, a rack member slidable in the casing and driven by the gear, a tubular guide sleeve slidable in the rack member and having a shoulder in its interior intermediate its ends, the outer end of said sleeve engageable by the outer end of the rack when the jack is it its collapsed position and the inner end of the sleeve extending beyond the inner end of the rack, means on the inner end of the sleeve bearing on the wall of the casing, means on the wall of the casing engageable with said means on the sleeve to limit extension thereof, a rod carried by the rack, and means on the inner end of the rod engageable with the shoulder of the sleeve to move the sleeve and limit extension of the rack.

2. In a jack, a casing, a gear carried by the casing, a rack member slidable in the casing and driven by the gear, a guide slidable relative to and bearing on the casing and the rack, means on the casing engageable with the guide to limit extension thereof, a rod carried by the rack and means on the rod engageable with the sleeve midway of its ends to move the sleeve and limit extension of the rack.

3. In a jack, a casing, a driven member slidable in the casing and bearing thereon, a guide slidable relative to and bearing internally on both the casing and driven member, means for limiting extension of the guide, and means on the driven member engageable with the guide after a predetermined extension of the driven member to pick up and extend the guide.

4. In a jack, a casing, a driven member mounted for extension relative to the casing, a guide member extensible by the driven member and bearing on the casing, and means for arresting extension of said members when the guide member is in engagement with approximately the inner half of the driven member.

5. In a jack, a casing, a driven member mounted for extension relative to the casing and bearing thereon, and means bearing on the interiors of the casing and driven members for increasing the effective bearing between the driven member and the casing when the driven member is extended.

ELMER C. GOEBERT.